US006750888B1

(12) United States Patent
Nakagawa

(10) Patent No.: US 6,750,888 B1
(45) Date of Patent: Jun. 15, 2004

(54) INFORMATION APPARATUS AND RECORDING MEDIUM HAVING SCALABLE DISPLAY OF IMAGE DATA REPRESENTING SOFTWARE OBJECTS

(75) Inventor: Junko Nakagawa, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/286,467

(22) Filed: Apr. 6, 1999

(30) Foreign Application Priority Data

Apr. 8, 1998 (JP) .......................................... 10-096475

(51) Int. Cl.[7] ................................................ G06F 6/00
(52) U.S. Cl. ...................................... 345/800; 345/838
(58) Field of Search .............................. 345/838, 763, 345/764, 765, 788, 800

(56) References Cited

U.S. PATENT DOCUMENTS 5,745,109 A * 4/1998 Nakano et al. ............. 345/838
6,008,809 A * 12/1999 Brooks ....................... 345/792
6,097,389 A * 8/2000 Morris et al. ............... 345/804
6,333,752 B1 * 12/2001 Hasegawa et al. .......... 345/764
6,462,761 B1 * 10/2002 Hasuo ........................ 345/838

FOREIGN PATENT DOCUMENTS

| JP | 5-61633 A | 3/1993 |
| JP | 6-103352 | 4/1994 |
| JP | 6-342357 | 12/1994 |
| JP | 6-342361 | 12/1994 |
| JP | 7-175616 | 7/1995 |
| JP | 7-281864 | 10/1995 |
| JP | 9-106336 | 4/1997 |
| JP | 9-106336 A | 4/1997 |

OTHER PUBLICATIONS

Corel Photo–Paint User Manual —Version 5.0 (First Printing), Copyright 1994, pp. 2, 5.*
Nat Gertter, The Complete Idiot's Guide to Microsoft PowerPoint 97, Copyright 1996, pp. 133–135.*
Corel Photo–Paint 5 User Manual, 1994, Corel Corporation, First Edition, pp. 2–5, 57,59–62,96.*
Gertler, "The Complete Idiot's Guide to Microsoft PowerPoint 97", 1996, Que, pp. 8,9, 29, 49, 51, 54, 80, 81, 134.*
Cowart, "MAstering Windows 98", Jun. 5, 1998, Sybex, p. 7 of Chapter 9.*
TD–325, TD–425 Targa 2000, Sep. 1997.*

* cited by examiner

Primary Examiner—Cao (Kevin) Nguyen
(74) Attorney, Agent, or Firm—Nixon & Vanderhye, PC

(57) ABSTRACT

An information apparatus including a management section for managing a software object in relation to a display unit; a scale change section for successively changing a scale of the display unit; and a display section for changing display of image data representing the software object in response to the successive change in the scale of the display unit.

5 Claims, 15 Drawing Sheets

FIG. 3A

Global variables and constants

| Name of variables and constants | Variables and constants | Contents and meanings |
|---|---|---|
| MAXCNT | Constant | Number of elements in image data table (Picture_Table) ······ Number of data pieces which can be assigned |
| IMGSIZE1 | Constant | Image size of icon |
| IMGSIZE2 | Constant | Image size of icon+file name |
| IMGSIZE3 | Constant | Image size of thumbnail |
| Picture_Table[] | Variable | Image data table |
| imagelistfg | Variable | 0: closed (termination) state; 1: open (start) state |
| schelistfg | Variable | 0: closed (termination) state; 1: open (start) state |
| msgwnd | Variable | Destination of message, e.g., scale change 0: image  1: schedule |
| ScaleBack[31] | Variable | Size of each scale of day 1 through day 31 (horizontal): for notification |

FIG. 3B

Variables and constants of each display section

| Name of variables | Variables and constants | Contents and meanings |
|---|---|---|
| LISTWNDX | Constant | List window size (horizontal) |
| LISTWNDY | Constant | List window size (vertical) |
| Scale[31] | Variable | Size of each scale of day 1 through day 31 (horizontal) |
| DragSize | Variable | Size of scale change |
| DragPos | Variable | Location of scale change (date) |
| Filename | Variable | Name of created file |
| DataBuf[] | Variable | For retraction of search match data number |

FIG. 4

```
struct imagedata{
        int     dataid;          //Data identification number
        char    image0fn[256];   //Original image file name
        char    image1fn[256];   //Icon image file name of original image
                                   (16x16)
        char    image2fn[256];   //(Icon+file name) image file name
                                   of original image (32x32)
        char    image3fn[256];   //Thumbnail image file name
                                   of original image (100x100)
        int     date1;           //Original image file creation date field
        int     date2;           //Original image file update date field
        int     date3;           //Original image file display date field
}Picture_Table[MAXCNT];
```

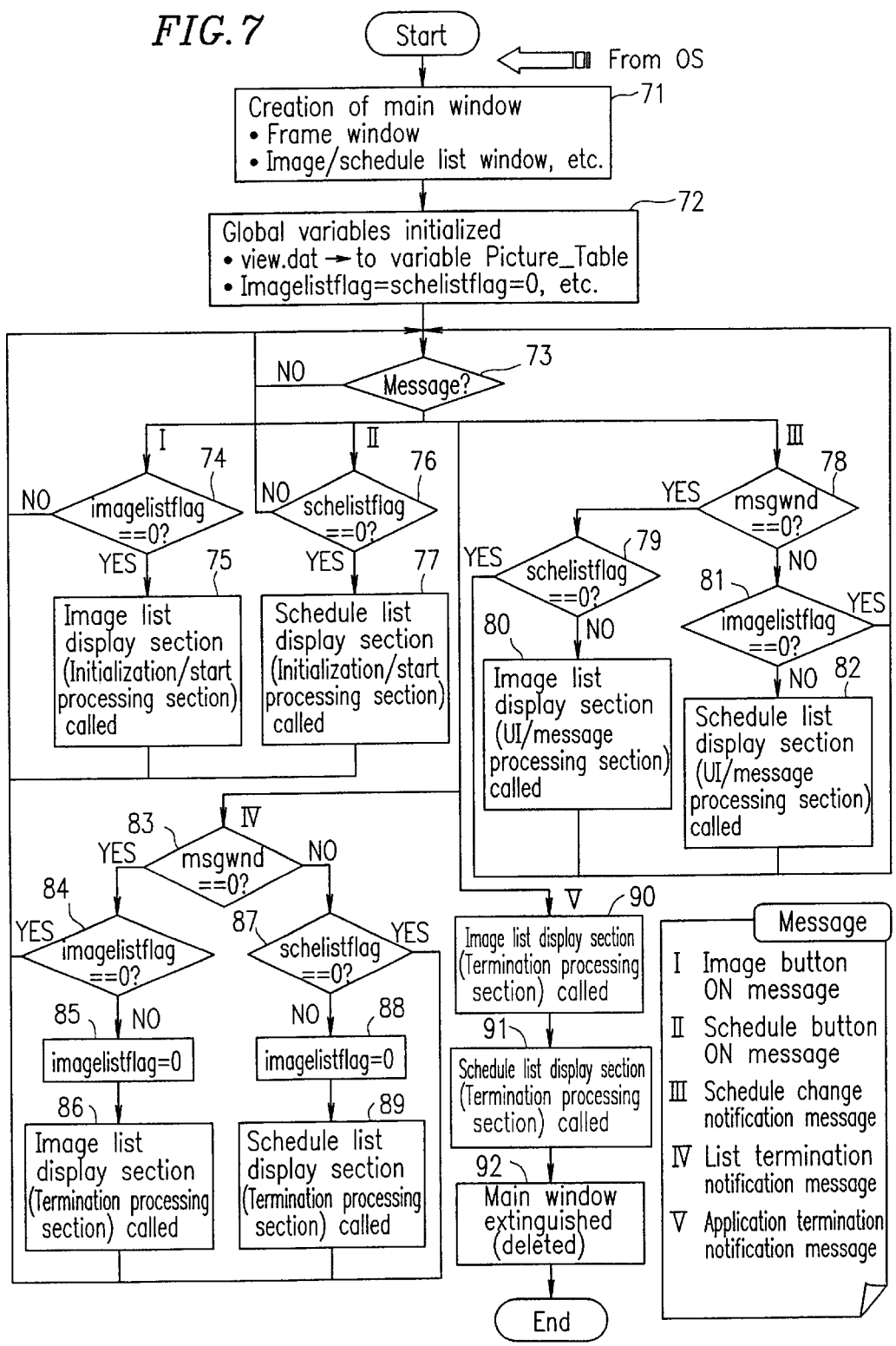

FIG.15
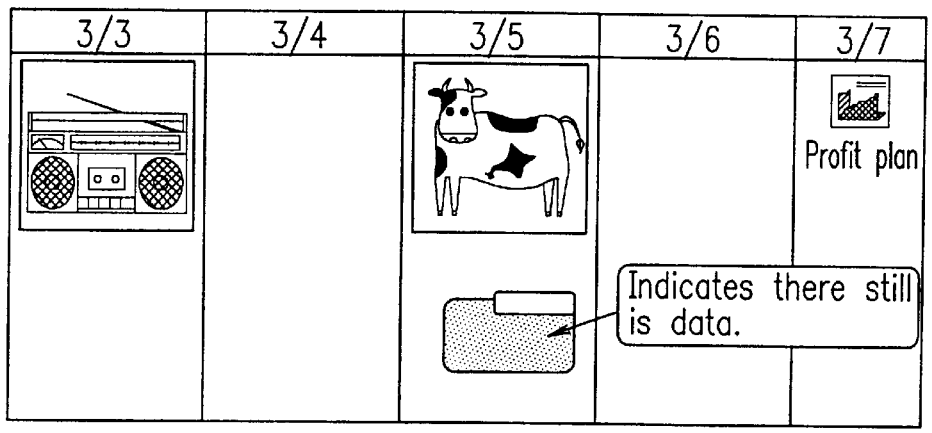
⇩ 3/5 region reduced
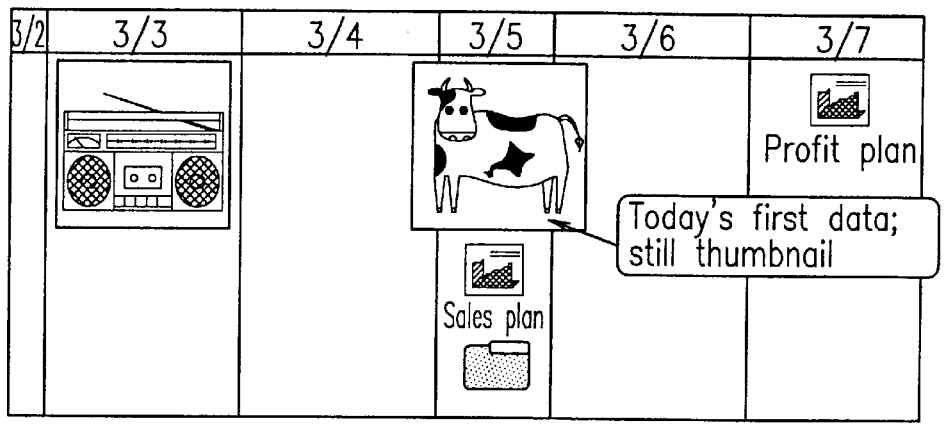
⇩ 3/5 region further reduced
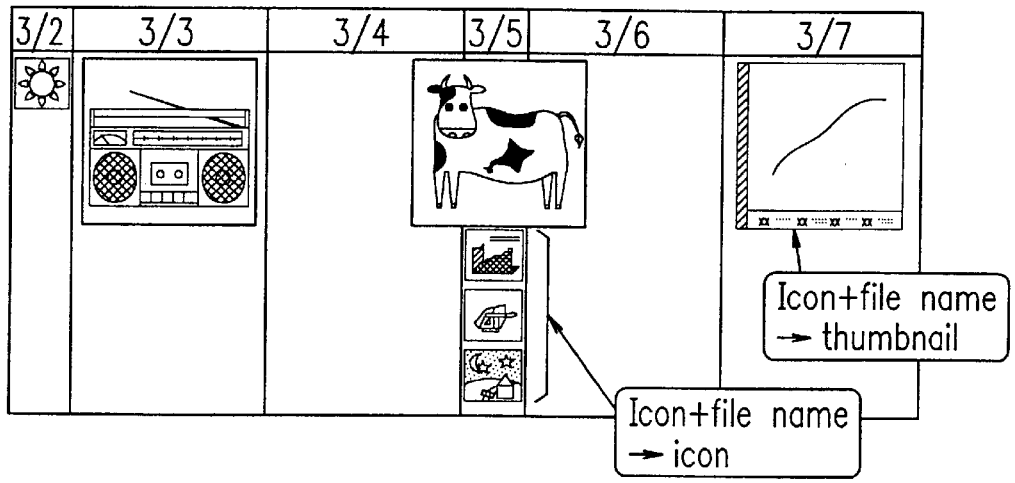

INFORMATION APPARATUS AND RECORDING MEDIUM HAVING SCALABLE DISPLAY OF IMAGE DATA REPRESENTING SOFTWARE OBJECTS

BACKGROUND OF THE INVENTION

1. Field of the Invention

The present invention relates to an information apparatus for displaying a software object in relation with a display unit and to a machine-readable recording medium having a program stored therein for allowing a computer to function as such an information apparatus.

2. Description of the Related Art

A software object which is recorded and managed can be displayed by the following three methods or a combination thereof.

(1) Displaying a name (e.g., file name) or an ID given in advance for identifying the software object;

(2) Displaying the contents themselves of the software object (e.g., a thumbnail of image data such as photo data): and/or (3) Displaying a symbol, generally referred to as an "icon", representing the software object.

As an application of method (3), Japanese Laid-Open Publication No. 5-61633 discloses an image processing apparatus for changing the display reduction ratio of an image in accordance with the number of objects of the image to be displayed in a display area to display all the objects in a fixed display area.

Japanese Laid-Open Publication No. 9-106336 discloses a process for enlarging and reducing the display area (area inside a display frame).

The image processing apparatus disclosed by Japanese Laid-Open Publication No. 5-61633, which fixes the area for displaying objects in advance, is not applicable to the case where the display area is changed in accordance with a user operation.

The process disclosed by Japanese Laid-Open Publication No. 9-106336 enlarges and reduces the display area in response a user operation. However, the size of letters in text displayed in the display area (the area inside the display frame) does not change regardless of the size of the display area. Accordingly, the range of the text is reduced as the display area is reduced, thus resulting in that some parts of the text are not displayed.

In the case where first-order data such as a text is displayed, substantially no problem occurs in terms of a user interface even when some parts of the text are not displayed. The reason for this is that the non-displayed parts can be displayed by enlarging the display area in a direction in which the text extends (e.g., in the horizontal direction in the case of the letters are written horizontally) by a user operation.

In the case where second-order data such as an image is displayed, user interface is required for enlarging the display area two-dimensionally. However, such user interface is difficult to realize due to display processing between data pieces adjacent to each other when one direction of the image is expressed as successive coordinates represented by a time axis or the like.

SUMMARY OF THE INVENTION

According to one aspect of the present invention, an information apparatus includes a management section for managing a software object in relation to a display unit; a scale change section for successively changing a scale of the display unit; and a display section for changing display of image data representing the software object in response to the successive change in the scale of the display unit.

In one embodiment of the invention, the display section changes the display of the image data representing the software object step-by-step in accordance with the scale of the display unit.

In one embodiment of the invention, the management section manages a plurality of image data representing the software object, and the display section selectively displays one of the plurality of image data in accordance with the scale of the display unit.

In one embodiment of the invention, when a plurality of software objects are related to one display unit, the display section displays each of the plurality of software objects in a display manner in accordance with an importance degree of each of the plurality of software objects.

In one embodiment of the invention, the display section comprehensively displays the plurality of software objects as one software object.

In one embodiment of the invention, the management section manages time information related to display of the software object, and the display section determines whether the software object is to be displayed or not in accordance with the time information.

In one embodiment of the invention, when the time information related to display of the software object is abnormal, the display section determines whether the software object is to be displayed or not in accordance with other time information related to display of the software object.

In one embodiment of the invention, the management section initializes the time information to time information related to creation of the software object when the software object is initially created.

According to another aspect of the present invention, an information apparatus includes a management section for managing a first type of software object in relation to a first display unit and managing a second type of software object, which is different from the first type of software object, in relation to a second display unit; a first display section for displaying the first type of software object; and a second display section for displaying the second type of software object. The first display section includes a first scale change section for successively changing a scale of the first display unit, and a first display portion for changing display of image data representing the first type of software object in response to a successive change in the scale of the first display unit. The second display section includes a second scale change section for successively changing a scale of the second display unit, and a second display portion for changing display of image data representing the second type of software object in response to a successive change in the scale of the second display unit.

In one embodiment of the invention, wherein the first display section further includes a notification section for notifying the change in the scale of the first display unit to the second display section, and the second display section further includes a notification section for notifying the change in the scale of the second display unit to the first display section.

According to still another aspect of the invention, a machine-readable recording medium storing a program and a data structure for allowing a computer to function as any of the above-described information apparatuses.

Thus, the invention described herein makes possible the advantages of (1) providing an information apparatus for changing second-order data such as an image in accordance with the scale of a display unit, and (2) providing a recording medium having a program and a data structure stored therein for operating the information apparatus.

These and other advantages of the present invention will become apparent to those skilled in the art upon reading and understanding the following detailed description with reference to the accompanying figures.

BRIEF DESCRIPTION OF THE DRAWINGS

FIG. 3A is a table showing global variables and constants, and FIG. 3B is a table showing variables and constants of each section of the display application shown in FIG. 2;

FIG. 4 shows a structure of an image data management table;

FIG. 7 is a flowchart illustrating exemplary processing performed by the main section shown in FIG. 2;

FIG. 15 shows an exemplary manner in which the display of image data representing a software object is changed in accordance with the change of the scale of the display unit.

DESCRIPTION OF THE PREFERRED EMBODIMENTS

Hereinafter, the present invention will be described by way of illustrative examples with reference to the accompanying drawings.

As used herein, the term "software object" is defined to encompass all objects, access to which is controllable in a computer system. For example, a software object encompasses a group of data pieces referred to by a single name (e.g., file, program, or main memory device area); an operation and an application implemented as adaptive business software; and data such as a text or image.

1. Hardware Structure

Figure 1:
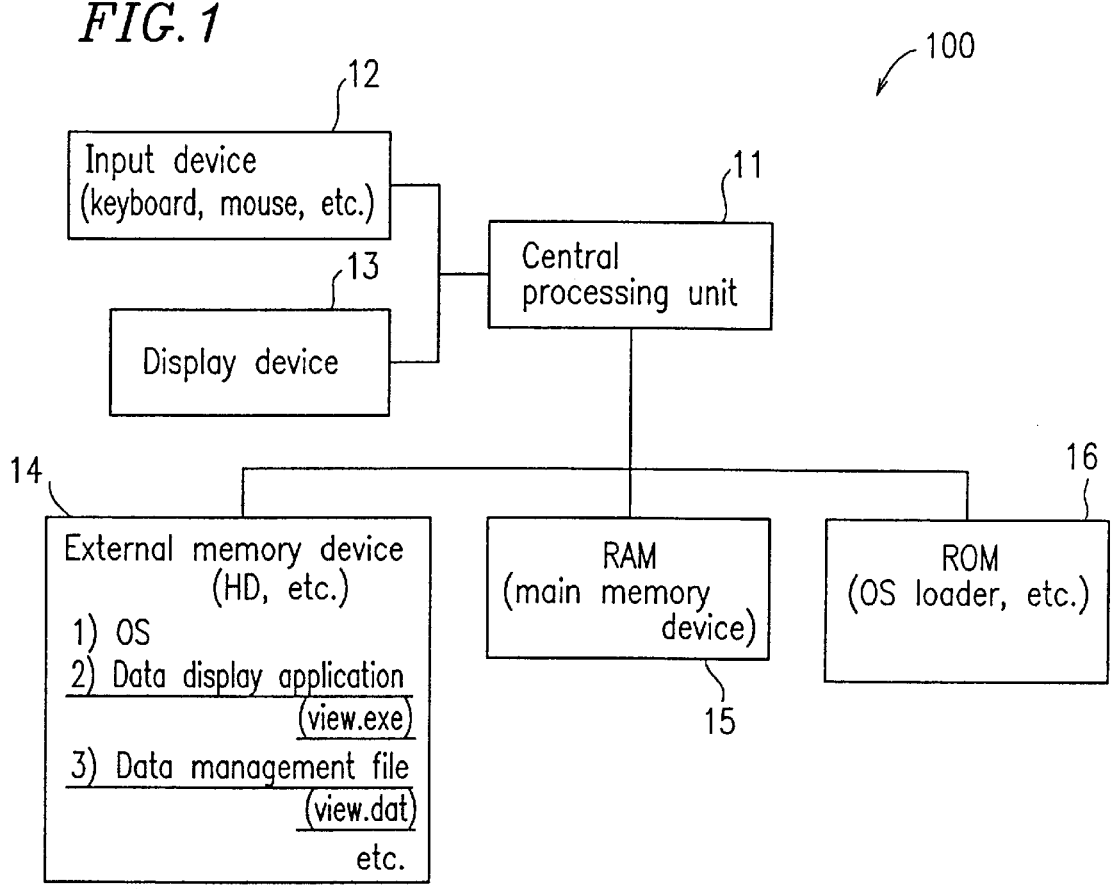
FIG. 1 is a block diagram illustrating a hardware structure of an information apparatus according to the present invention.

FIG. 1 is a block diagram illustrating a hardware structure of an information apparatus 100 according to the present invention. The information apparatus 100 is, for example, a personal computer (PC). The information apparatus 100 includes a central processing unit (CPU) 11, an input device 12 such as, for example, a keyboard or a mouse, a display device 13, an external memory device 14, a RAM (random access memory) 15 as a main memory device, and a ROM (read only memory) 16.

The external memory device 14 stores an operating system (OS) therein. The operating system controls starting processing of application software, file access processing, and access processing to various standard and peripheral devices. When the main power (not shown) of the information apparatus 100 is turned on, an OS loader (not shown) stored in the ROM 16 loads the operating system to the RAM 15. Thus, the operating system is started.

Then, the operating system starts application software based on user input from the input device 12 or notifies a message to the application software. The application software processes the message sent from the operating system to realize processing in accordance with user input. Such processing is executed by the CPU 11. The processing result is displayed on the display device 13.

2. Software Structure

Figure 2:
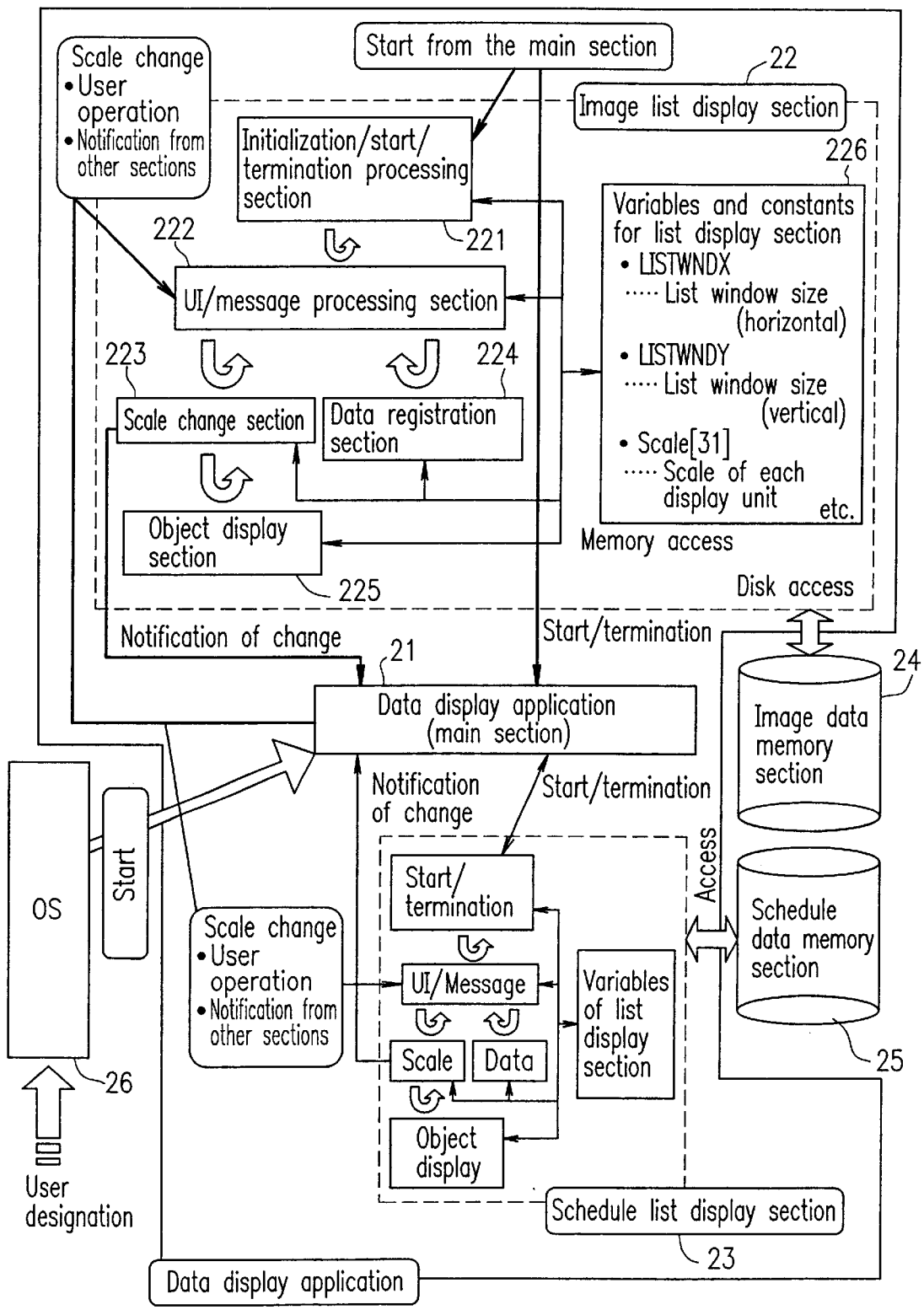
FIG. 2 shows a software structure of a data display application according to the present invention.

FIG. 2 shows a software structure of a data display application according to the present invention. The data display application is application software which is started by the operating system. The data display application is stored in, for example, the external memory device 14 shown in FIG. 1 in the format of, for example, view.exe.

The data display application includes three blocks: a main section 21, an image list display section 22, and a schedule list display section 23.

2.1 Processing Performed by the Main Section 21

Figure 6:
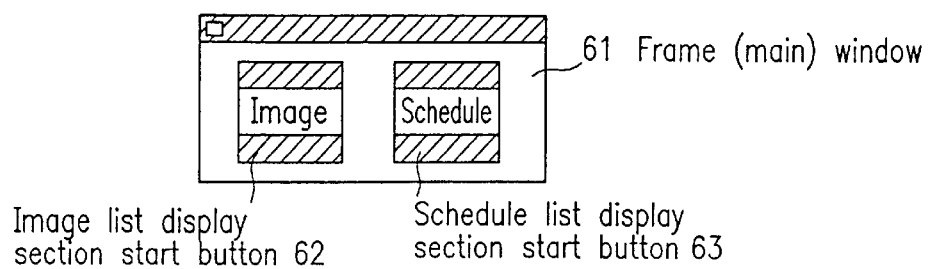
FIG. 6 shows a window structure of a main section of the display application shown in FIG. 2.

FIG. 6 shows a structure of a main window 61 of the main section 21 (FIG. 2). In the main window 61, an image list display section start button 62 and a schedule list display section start button 63 are displayed.

FIG. 7 is a flowchart illustrating exemplary processing executed by the main section 21 (FIG. 2). The main section 21 is started by the operating system in accordance with user input which instructs the information apparatus 100 to start the data display application. When the main section 21 is started, the main window 61 (FIG. 6) is created in step 71, and then various variables are initialized in step 72.

When the user presses the image list display section start button 62 (FIG. 6), message I is sent from the operating system to the main section 21. When message I is selected by message selection step 73, and the image list flag is not set (imagelistflag==0) at step 74, an image list display section (initialization/start processing described below) is called by step 75. When the user presses the schedule list display section start button 63, message II is sent from the operating system to the main section 21. When message II is selected, a display section for schedules (initialization/start processing section described below) is called in step 77.

When the scale of the display unit is changed in the image list display section or the schedule list display section, message III is sent from the operating system to the main section 21. When message III is selected, it is determined whether the scale of the display unit has been changed in the image list display section or the schedule list display section in step 78, and the message indicating "the scale of the display unit has been changed" is sent from the one of the display sections in which the scale of the display unit has been changed to the other display section in step 80 and 82.

The main section 21 further executes processing which corresponds to message IV for terminating each of the display sections (steps 83 through 89), and processing which corresponds to message V for terminating the data display application (steps 90 through 92).

2.2 Processing Performed by the Image List Display Section 22

FIG. 4 shows an image data management table for managing image data to be processed by the image list display section 22 (FIG. 2). The image data management table is stored in, for example, the external memory device 14 (FIG. 1) or an image data memory section 24 (FIG. 2) in the format of view.dat.

The image data management table includes MAXCNT pieces of Picture_Table arranged therein. The items of Picture_Table are: a data ID for identifying data, an original image file, three image files representing the original image, and date information of the original file.

The three image files representing the original image are used to change the display of the original image step by step in accordance with the scale of the display unit. The three image files are, for example: an image file representing the "icon" of the original image (size: 16×16 (IMGSIZE1)), an image file representing the "icon+file" of the original image (size: 32×32 (IMGSIZE2)), and an image file representing the "thumbnail" of the original image (size: 100×100 (IMGSIZE3)).

The number of the image files representing the original image is not limited to three. The number of the image files can be arbitrarily set in accordance with the number of the original images which can be displayed step by step. The sizes of the image files are not limited to the above-mentioned sizes. The size of each image file can be arbitrarily determined.

The image file created by the user can be registered in the second or later entries of Picture_Table, i.e., Picture_Table [1] through Picture_Table [MAXCNT-1]. In the first entry of Picture_Table (i.e., Picture_Table [0]), an image file used when grouped is registered in advance.

Figure 5:
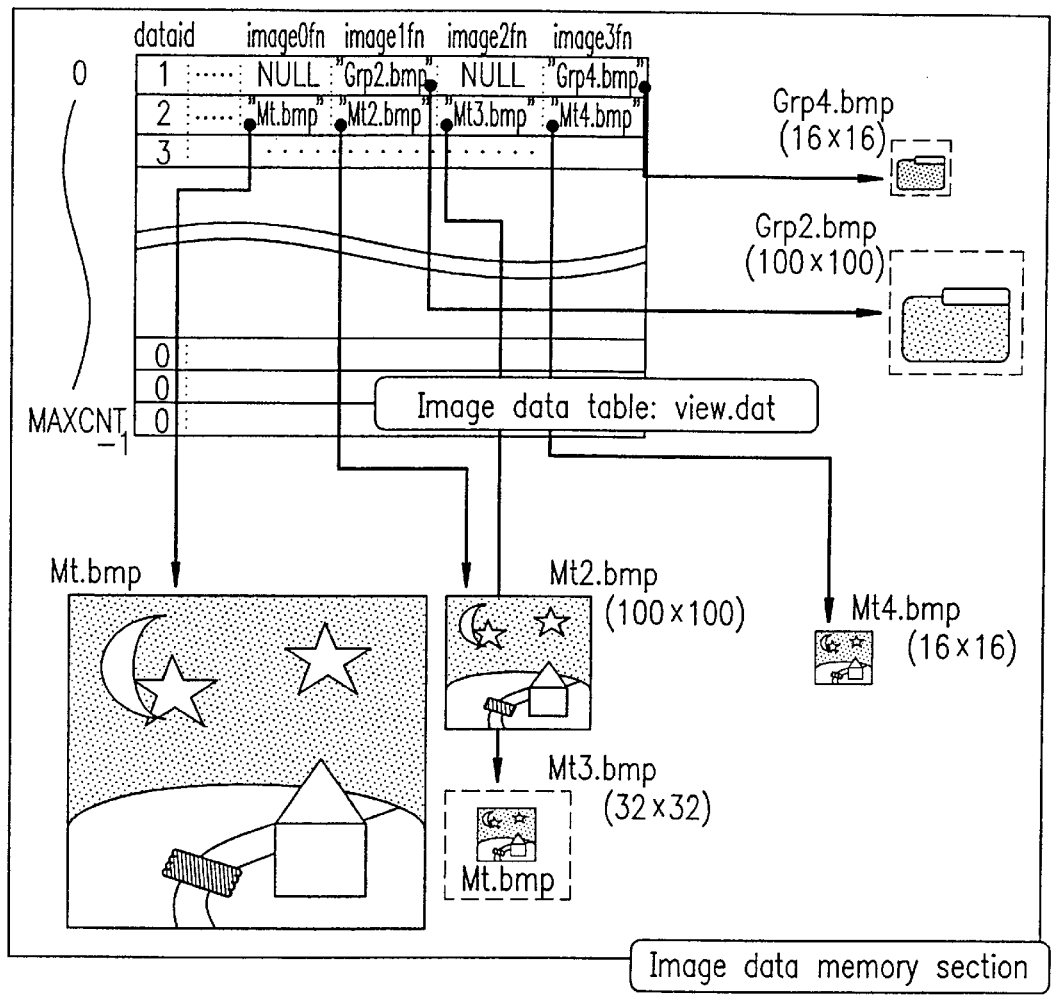
FIG. 5 shows an exemplary manner in which a plurality of image files are managed by the image data management table shown in FIG. 4.

FIG. 5 shows an exemplary manner in which a plurality of image files are managed by the image data management table. The second entry (i.e., the entry having data ID=2) in the image data management table indicates that three image files, i.e., Mt2.bmp, Mt3.bmp and Mt4.bmp are managed in correspondence with an original image file Mt.bmp.

With reference to FIG. 2, the software structure of the image list display section 22 will be described. The image list display section 22 includes an initialization/start/termination processing section 221, an UI/message processing section 222, a scale change section 223, a data registration section 224, and an object display section 225.

For displaying image data, each of the sections 221 through 225 refer to global variables and constants 226 or variables and constants of each of the display sections 22 and 23. FIGS. 3A and 3B show such exemplary global variables and constants. FIG. 3A shows exemplary global variables and constants, and FIG. 3B shows exemplary variables and constants of each display section. FIGS. 3A and 3B show only the variables and constants required for managing and displaying the data of one month (i.e., day 1 through day 31) when the display unit is one day. For this reason, the number of the factors of the arrangement constant Scale [ ] is 31.

In the following description, the display unit related to a time axis is one day, and the information apparatus 100 (FIG. 1) manages and displays the data corresponding to day 1 through day 31, for simplicity. Needless to say, according to the present invention, the display unit is not limited to one day, and the information apparatus 100 can be structured to manage and display data corresponding to more than one month.

2.2.1 Processing Performed by the Initialization/Start/Termination Processing Section 221

The initialization/start/termination processing section 221 (FIG. 2) includes an initialization/start processing section and a termination processing section.

Figure 8A:
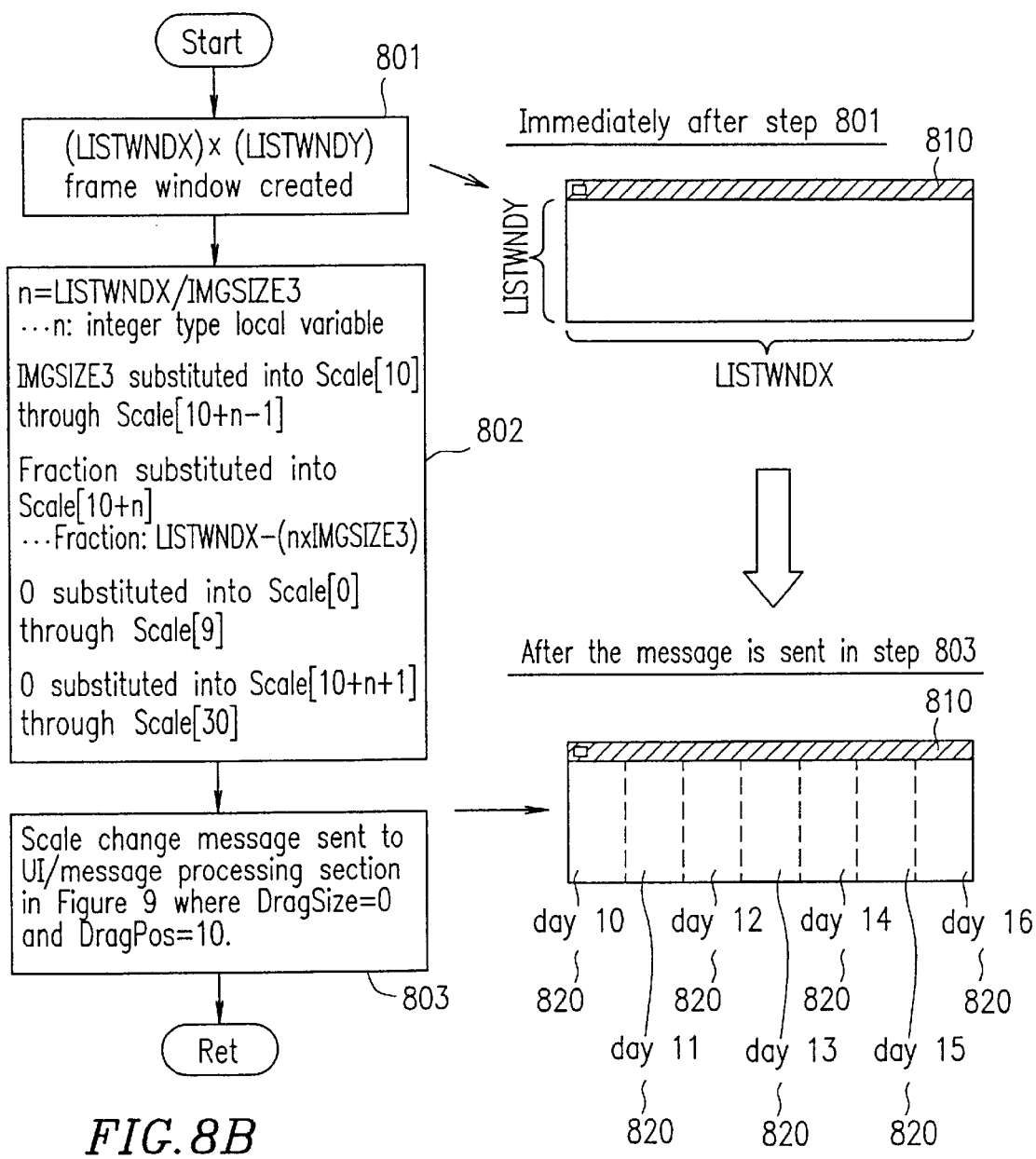
FIG. 8A is a flowchart illustrating exemplary processing performed by an initialization/start processing section of an image list display section of the display application shown in FIG. 2
Figure 8B:
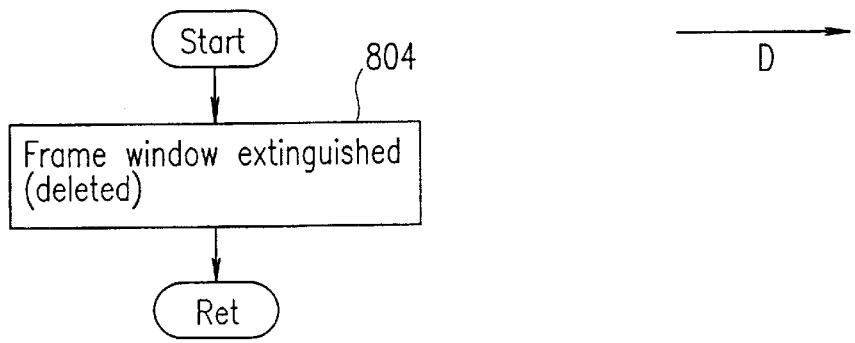
FIG. 8B is a flowchart illustrating exemplary processing performed by a termination processing section of the image list display section.

FIG. 8A is a flowchart illustrating exemplary processing performed by the initialization/start processing section, and FIG. 8B is a flowchart illustrating exemplary processing performed by the termination processing section, in which the frame window is deleted at step 804. The initialization/start processing section is called by the main section 21 (FIG. 2) in step 75 (FIG. 7). The initialization/start processing section generates a frame window 810 in step 801, initializes various variables in step 802, and sends a scale change message to the UI/message processing section 222 (FIG. 2) in step 803.

In this manner, seven display units 820 corresponding to day 10 to day 16 are displayed in the frame window 810. The scales of the seven display units 820 are respectively stored in Scale [9] through Scale [15]. Herein, the scale of the display unit refers to the length of the display unit in the direction along a prescribed axis (e.g., time axis). In the example shown in FIG. 8A, the scale of the display unit is the width of the display unit 820 in a horizontal direction (i.e., direction indicated by arrow D). As described below, the scale of the display unit can be changed by a user operation.

The image data is displayed on the frame window generated by the initialization/start section which is called in step 75 (FIG. 7), and the schedule data is displayed on the frame window generated by the initialization/start section which is called in step 77 (FIG. 7). Thus, the image data and the schedule data are displayed group by group in accordance with the type of the data.

The termination processing section is called by the main section 21 (FIG. 2) in step 90 (FIG. 7). The termination processing section erases the frame window 810 in step 92.

2.2.2 Processing Performed by the UI/message Processing Section 222

Figure 9:
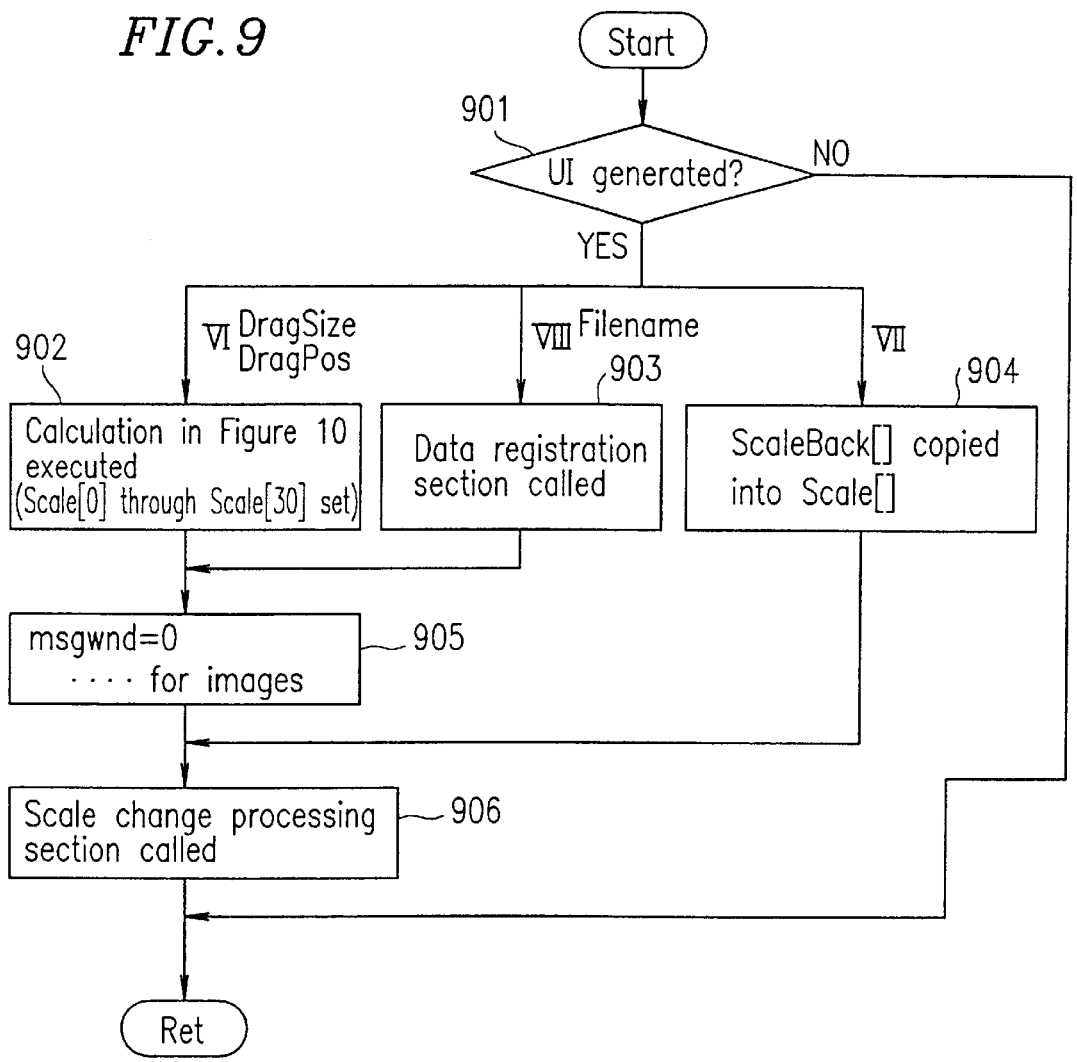
FIG. 9 is a flowchart illustrating exemplary processing performed by an UI/message processing section of the image list display section.

FIG. 9 is a flowchart illustrating processing performed by the UI/message processing section 222 (FIG. 2).

When the scale of the display unit is changed by a user operation, scale change message VI is created at UI-generating step 901. Scale change message VI is created, for example, by a user operation of performing a drag operation by a prescribed distance from one display unit.

Figure 10:
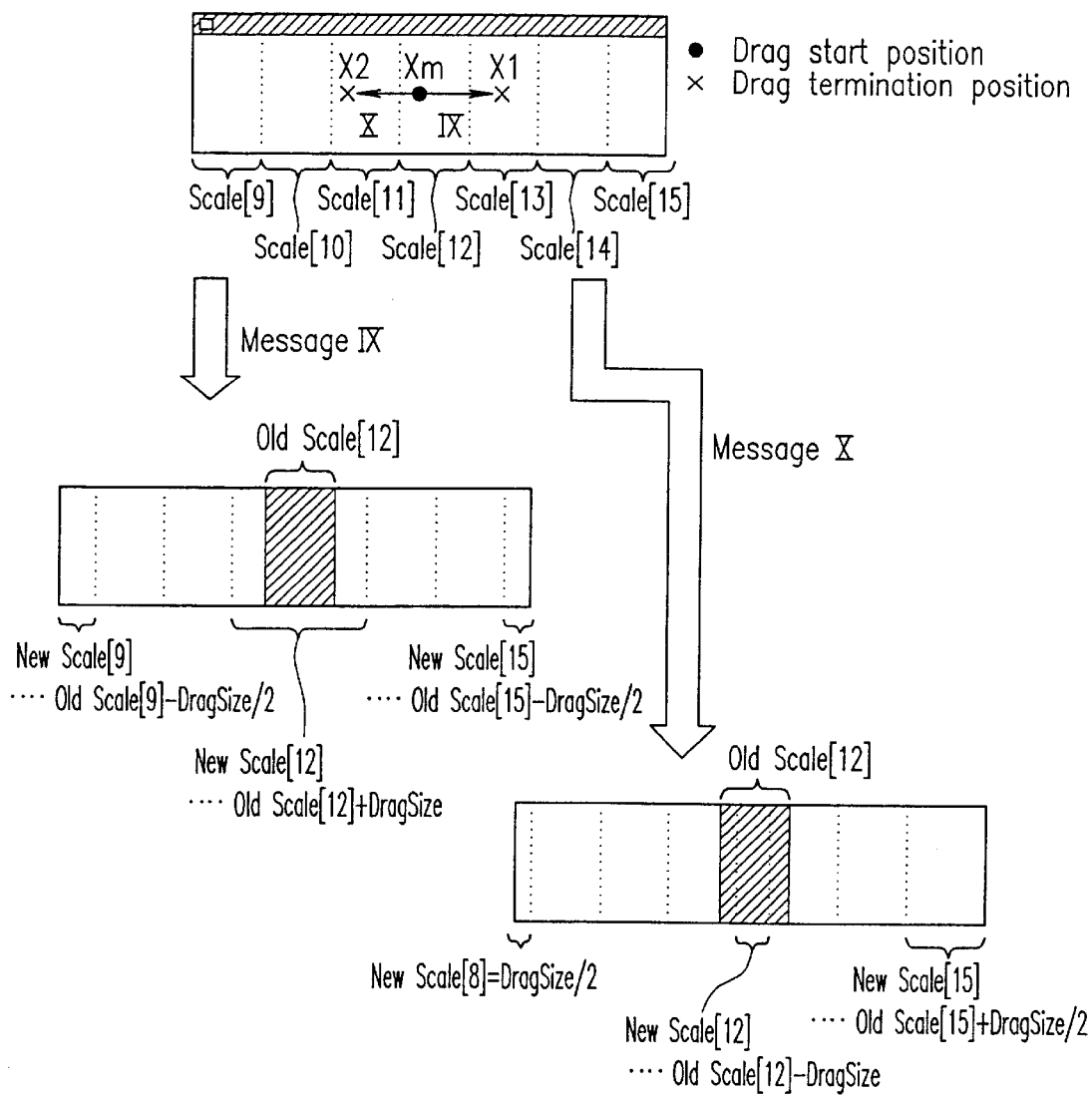
FIG. 10 shows an exemplary manner in which a scale of the display unit is successively changed in accordance with a scale change message.

When scale change message VI is created, the calculation processing shown in FIG. 10 is executed in step 902, and a flag notifying the frame window in the image list display section that the scale of the display unit has been changed is set in step 905. Then, the scale change section 223 (FIG. 2) is called in step 906.

FIG. 10 shows processing for successively changing the scale of the display unit in accordance with the scale change message. The scale change message has DragPos and DragSize as parameters. DragPos indicates the position of the display unit, among a plurality of display units, including coordinate Xm which represents the drag start position. The value of DragPos can be found based on the coordinate Xm representing the drag start position and Scale [0] through Scale [30]. DragSize indicates the distance by which the drag operation has been performed in the direction along the time axis of the display unit (i.e., horizontal direction of the display unit). The value of DragSize can be found by DragSize=X1−Xm. In the expression, X1 is the coordinate representing the drag termination position.

When DragSize=X1−Xm≧0 (message XI in FIG. 10), the scale of the display unit designated by DragPos is enlarged. For example, when DragPos=12, the scale of the display unit is changed as represented by expression (1). In expression (1), Scale [9] and Scale [15] correspond to the display units displayed at ends of the frame window.

Scale [9]=Scale [9]−DragSize/2

Scale [10]=Scale [10]

Scale [11]=Scale [11]

Scale [12]=Scale [12]+DragSize

Scale [13]=Scale [13]

Scale [14]=Scale [14]

Scale [15]=Scale [15]−DragSize/2     Expression (1)

When Scale [9] and Scale [15] are not sufficient for processing (subtraction), Scale [10] and Scale [14] adjacent thereto can be used.

When DragSize=X1−Xm<0 (message X in FIG. 10), the scale of the display unit designated by DragPos is reduced. For example, when DragPos=12, the scale of the display unit is changed as represented by expression (2).

Scale [8]=DragSize/2

Scale [9]=Scale [9]

Scale [10]=Scale [10]

Scale [11]=Scale [11]

Scale [12]=Scale [12]−DragSize

Scale [13]=Scale [13]

Scale [14]=Scale [14]

Scale [15]=Scale [15]+DragSize/2     Expression (2)

The processing for changing the scale of the display unit is different between the left end of the frame window and the right end of the frame window so that the scale of the display unit is adjusted by the DragSize which has been subtracted with the upper limit of IMGSIZE3. FIG. 10 shows the result of adjustment in the case where the relationships of Scale [9]≧IMAGESIZE and Scale [15]+DragSize/2≦IMAGESIZE are fulfilled before the scale of the display unit is changed.

As described above, the scale of the display unit is changed "successively" in accordance with the value of DragSize. As used herein, the term "successively" means that the value of the scale of the display unit is recalculated every minimum unit of DragSize (i.e., every pixel).

In the example shown in FIG. 10, the scale of the display unit is not changed from the start to termination of the drag operation, and is only changed after the drag operation is terminated. As can be appreciated, it is not necessary to change the scale of the display unit from the start to termination of the drag operation in real time. Real-time change of the scale of the display unit, which drastically increases the load of display processing, is not preferable.

Returning to FIG. 9, when new image data is generated, data generation message VIII is created. Data generation message VIII is created, for example, by a user operation of inputting image data from a digital camera to the information apparatus 100 (FIG. 1).

When data generation message VIII is created, the data registration section 224 (FIG. 2) is called in step 903. Then, the processing of steps 905 and 906 is executed.

Messages VI and VIII are not directly created by the above-described user operations. In actuality, high-level messages such as messages VI and VIII need to be created using, for example, a low-level UI message provided by the operating system (e.g., a message generated when a button of a mouse is pressed), and association with application software for file processing and with driver software. The processing for generating the high-level messages is not the point of the present invention and thus is not described in detail in the specification.

When the scale of the display unit is changed in a window for displaying a list other than an image list, scale change message VII is created. Scale change message VII is created, for example, when the scale of the display unit is changed in the frame widow for displaying the schedule list.

When scale change message VII is created, the contents of the arrangement variable ScaleBack [ ] are copied to the arrangement variable Scale [ ] in step 904. In the ScaleBack [ ], the change result of the scale of the display unit is retracted in advance. Then, the processing in step 906 is executed.

2.2.3 Processing Performed by the Scale Change Section 223

Figure 11:
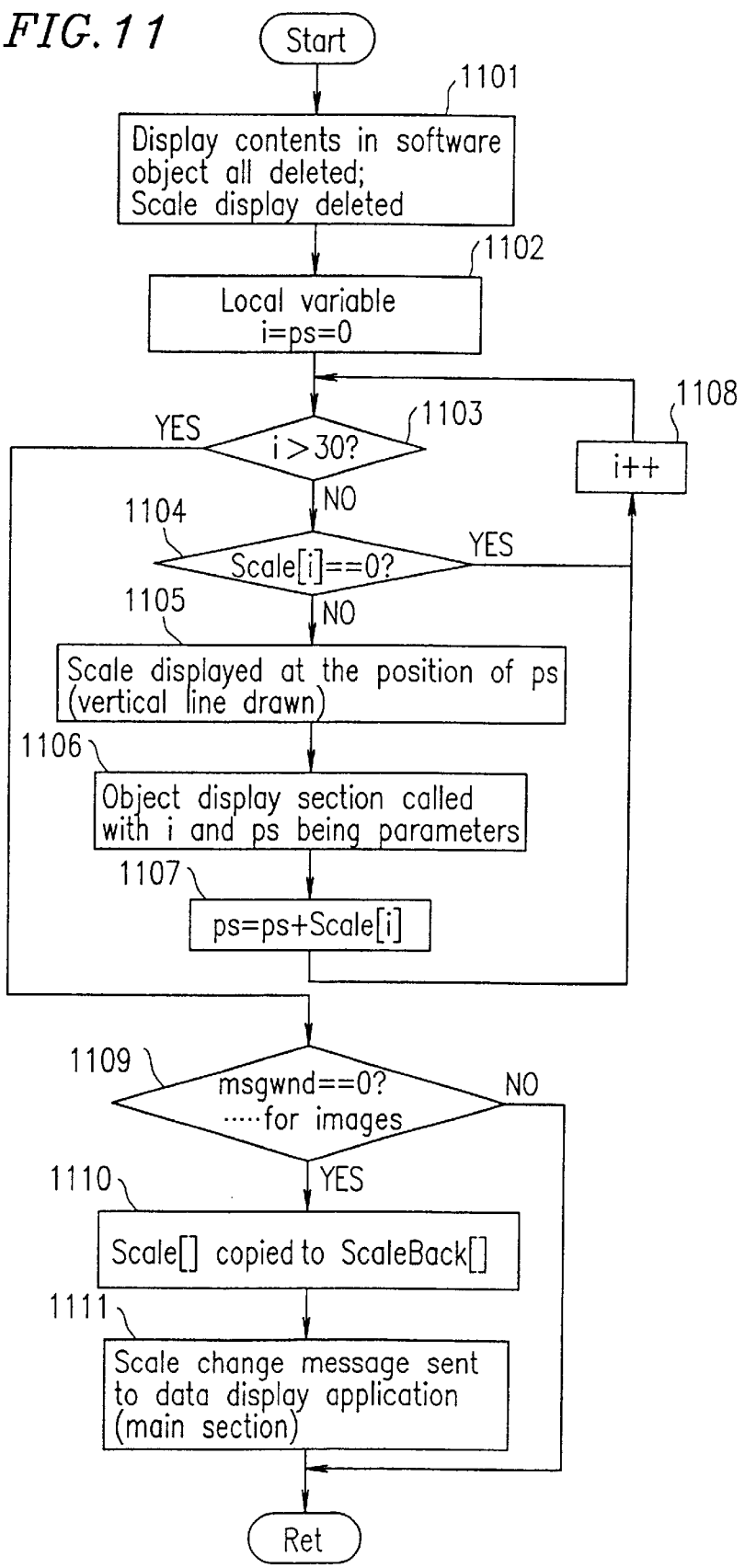
FIG. 11 is a flowchart illustrating exemplary processing performed by a scale change section of the image list display section.

FIG. 11 is a flowchart illustrating processing performed by the scale change section 223 (FIG. 2). The scale change section 223 deletes display contents and scale display at step 1101, sets local variables i and ps to 0 at step 1102, checks if the local variable i is less than 30 at step 1103 and that the contents of the arrangement variable Scale [i] is non-zero at step 1104.

The scale change section 223 displays the scale of the display unit in accordance with the contents of the arrangement variable Scale [ ] in step 1105. The scale of the display unit is displayed by, for example, drawing a vertical line between two adjacent display units. The position of the vertical line is represented by variable ps in expression (3) in step 1107.

$$ps = ps + Scale[i]$$     Expression (3)

In expression (3), i is an index variable incremented one by one (step 1108).

The scale change section 223 calls the object display section 225 (FIG. 2) using the variables i and ps as parameters in step 1106. Thus, a software object is displayed on the display unit corresponding to the variables i and ps.

It is determined whether the scale of the display unit has been changed for each image in step 1109, and if so, the arrangement variable Scale [ ] is copied to the variable ScaleBack [ ] in step 1110 and the scale change section 223 sends a scale change message to the main section 21 in step 1111. Thus, the message indicating that the scale of the display unit in the image list display section 22 (FIG. 2) has been changed is notified to the other image display sections (e.g., the schedule list display section 23 shown in FIG. 2) through the main section 21.

2.2.4 Processing Performed by the Data Registration Section 224

Figure 12:
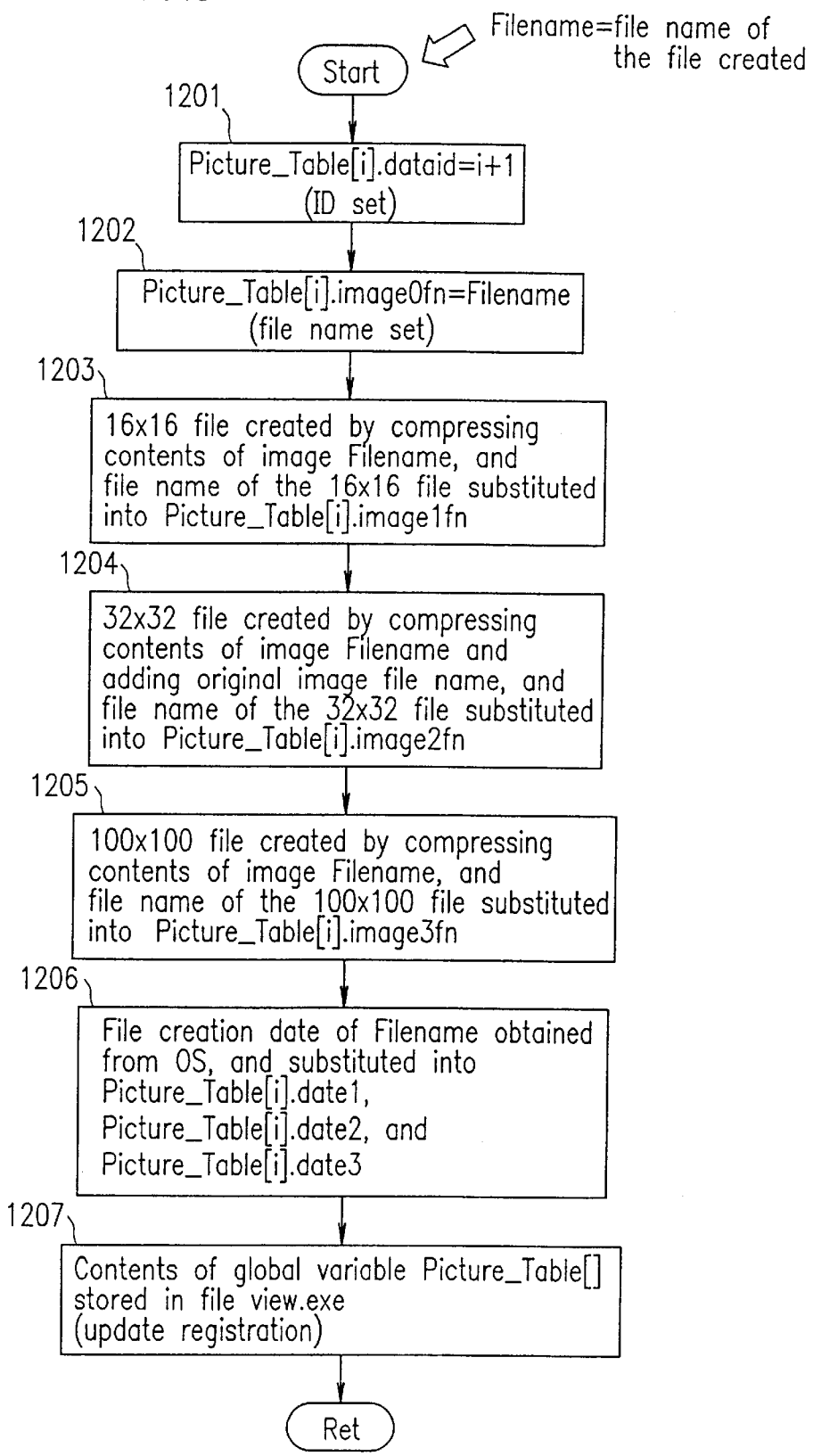
FIG. 12 is a flowchart illustrating exemplary processing performed by a data registration section of the image list display section.

FIG. 12 is a flowchart illustrating exemplary processing performed by the data registration section 224 (FIG. 2).

The data registration section 224 sets data in each item in each entry of the arrangement variable Picture_Table [ ] shown in FIG. 4 in steps 1201 through 1206, an stores the contents of the arrangement variable Picture_Table [ ] in the file view.dat in step 1207.

The three image files representing the original image can be obtained by reducing the original image. The original image can be reduced by reducing the original image itself to a prescribed size (method 1) or by generating a symbol (abstract) image representing the original image (method 2).

Method 1 can be easily realized using, for example, Windows® system functions. In lieu of the Windows® system functions, various known image reduction methods can also be used. Alternatively, a unique image reduction method can be used.

Method 2 is analogous to a method where a symbol referred to as "icon" is associated with a software object referred to as "application". For example, in the Windows® system, a symbol referred to as "icon" is prepared in advance for each of the applications. The user can designate an icon in order to designate the application associated with the icon. For example, the data display application (view.exe) is one application. Accordingly, the data display application can be associated with an icon although it is not indispensable. The data regarding the icon can be accessed from other applications. In other words, it is possible to obtain data regarding the icon from another application and display the data.

In this specification, an "icon" refers to an image file obtained by reducing the original image file to a size of 16×16. Such a size is selected because the size of the icon in the Windows® system is 16×16. A 32×32 image file is obtained by adding a file name to a 16×16 image file.

The data registration section 224 obtains a creation date of the original image file from the operating system and substitutes the creation date to the image file creation date field (Picture_Table [i].date1), original image file update date field (Picture_Table [i].date2) and original image file display date field (Picture_Table [i].date) in step 1206. The update date is the same as the creation date because the first file creation date is the first update date. However, the update date is not always the same as the file creation date in existing operating systems. For example, when an existing file is copied, the creation date is the date of copying, but regarding the update date, the attribute of the existing file may be retained. When an existing file is copied, the creation date is not updated because the file has already existed.

2.2.5 Processing Performed by the Object Display Section 225

Figure 13:
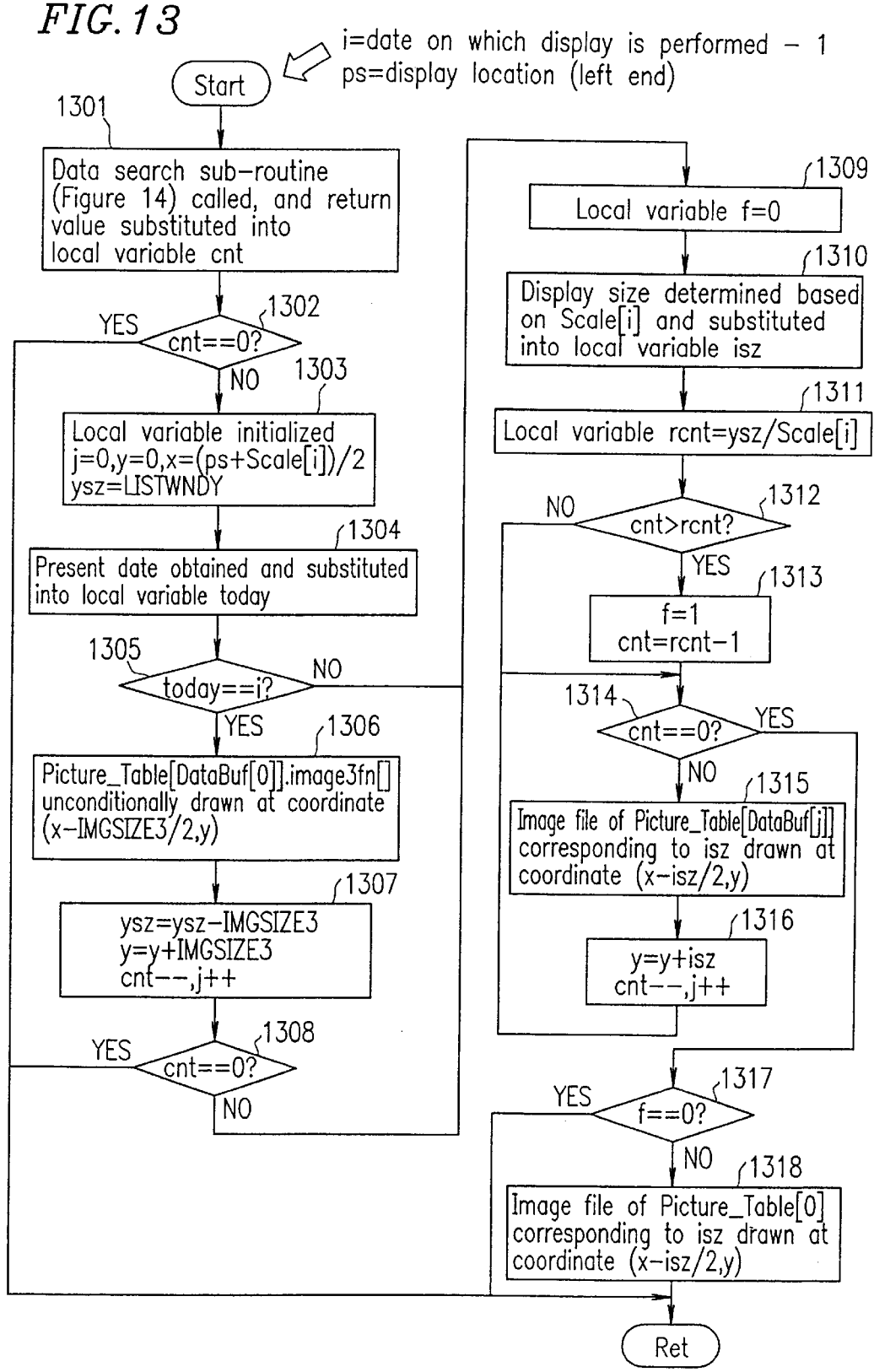
FIG. 13 is a flowchart illustrating exemplary processing performed by an object display section of the image list display section.

FIG. 13 is a flowchart illustrating exemplary processing performed by the object display section 225 (FIG. 2). The object display section 225 is called along with the variable i representing the display unit and the variable ps representing the display position of the left end of the display unit. In the following description, the display unit is assumed to correspond to the date.

First, a data search sub-routine is called in step 1301. Thus, the software objects to be displayed are extracted. The number of the software objects to be displayed is returned as the return value of the data search sub-routine. The data search sub-routine will be described in detail below with reference to FIG. 14.

When the number of the software objects to be displayed is not 0 (step 1302), display processing in steps 1303 through 1313 is executed as described below.

After the local variable is initialized in step 1303, the present date is obtained in step 1304. The present date is obtained, for example, from the operating system using the system functions. In step 1305, it is determined whether or not the input variable i matches the present date.

When the input variable i matches the present date, the software object first extracted among the software objects extracted by the data search sub-routine is displayed in the format of a thumbnail image file (image file representing the "thumbnail" of the original image) in step 1306. In other words, when the input variable i matches the present date, the thumbnail image file among the three image files representing the original image is unconditionally selected, and the thumbnail image file is displayed. Thus, the software objects are displayed in different manners in accordance with the importance degree of each of the software objects.

When the input variable does not match the present date, one of the three image files representing the original image is selected in accordance with Scale [i] indicating the size of the scale of the display unit, and the selected image file is displayed in step 1315. Which file is selected is indicated by local variable isz.

Specifically, when Scale $[i] \geq$ IMGSIZE3, isz=IMGSIZE3, and file image3fn (thumbnail image file) is selected. When IMGSIZE>Scale $[i] \geq$ IMGSIZE2, isz=IMGSIZE2, and file image2fn (icon+file name) is selected. When IMGSIZE2>Scale [i], isz=IMGSIZE1, and file image1fn (icon) is selected. IMGSIZE1, IMGSIZE2 and IMGSIZE3 are, for example, 16, 32 and 100, respectively. In actuality, it is necessary to consider some margin processing and processing in the case when the size of the scale of the display unit is less than IMGSIZE1, but such processing will not be described in detail herein.

The position where the selected image file is displayed is represented by local variables x and y. The local variable x represents the center coordinate in the horizontal direction at which the selected image file is displayed. The local variable y represents the center coordinate in the vertical direction at which the selected image file is displayed.

Prior to step 1315, it is determined in step 1312 whether or not all the software objects to be displayed can be displayed, and a flag f (local variable f) and a display software object counter (local variable cnt) are set in steps 1309 and 1313. After step 1315, local variable y is incremented by isz, cnt is decremented and j is incremented at step 1316. When all the software objects to be displayed cannot be displayed (step 1317), comprehensive display processing is executed for comprehensively displaying one software object in lieu of all the software objects. The comprehensive display processing is achieved by, for example, referring to the first entry (i.e., Picture_Table [0]) in the image data management table (FIG. 4) (step 1318). However, as shown in FIG. 5, Picture_Table [0] does not have at 32×32 reduction image file. Accordingly, when the size of the display unit is less than IMGSIZE3, file image1fn (icon) is selected.

Figure 14:
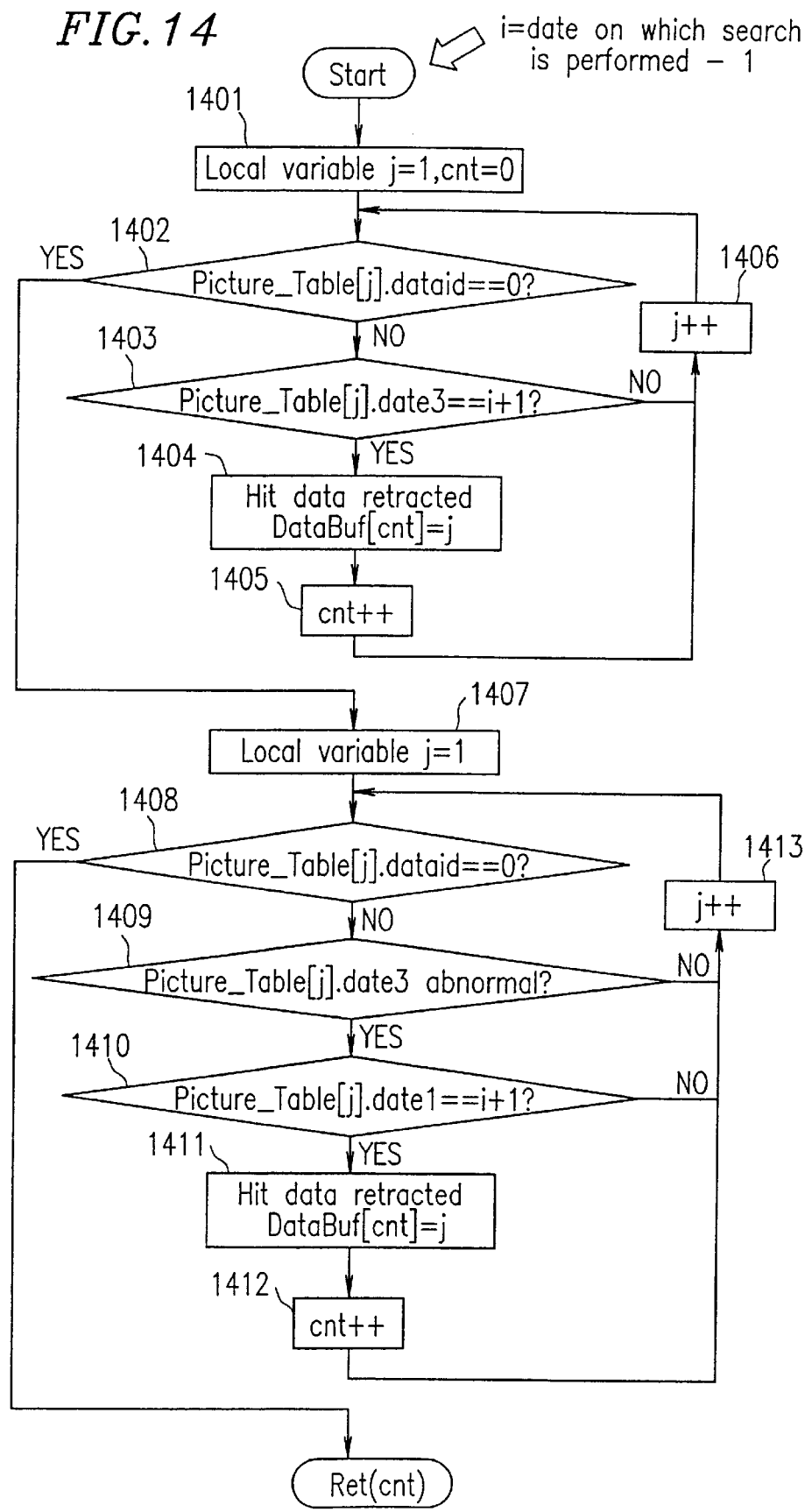
FIG. 14 is a flowchart illustrating exemplary processing performed in a data search sub-routine.

FIG. 14 is a flowchart illustrating exemplary processing performed in the data search sub-routine. The data search subroutine is called along with the input variable i. In the data search sub-routine, data having a date matching the input parameter (i.e., variable) i among the data managed by the image data management table (arrangement variable Picture_Table [ ]) is retracted to an arrangement variable DataBuf [ ] as follows.

First, data having a display date matching the input variable i (Picture_Table [ ].date3) is extracted in steps 1401 through 1406. Next, a date having a creation date matching the input variable i (Picture_Table [ ].date1) is extracted for data having abnormal display date (e.g., display date other than 1 through 31) in steps 1407 through 1413.

FIG. 15 is an exemplary manner in which the display of the image data representing the software objects is changed in accordance with the change of the scale of the display unit. In the example shown in FIG. 15, the present date is March 5 (indicated as 3/5 in FIG. 15). As the scale of the display unit corresponding to March 5 is reduced, the display of the image data representing the software objects relating to March 5 is changed. In other words, as the scale of the display unit corresponding to March 5 is reduced, the software objects relating to March 5 are reduced. However, the image date representing the first software object relating to March 5 is not changed. In this example, the size of the thumbnail image of the cow remains the same regardless of the size of the scale of the display unit.

Figure 16:
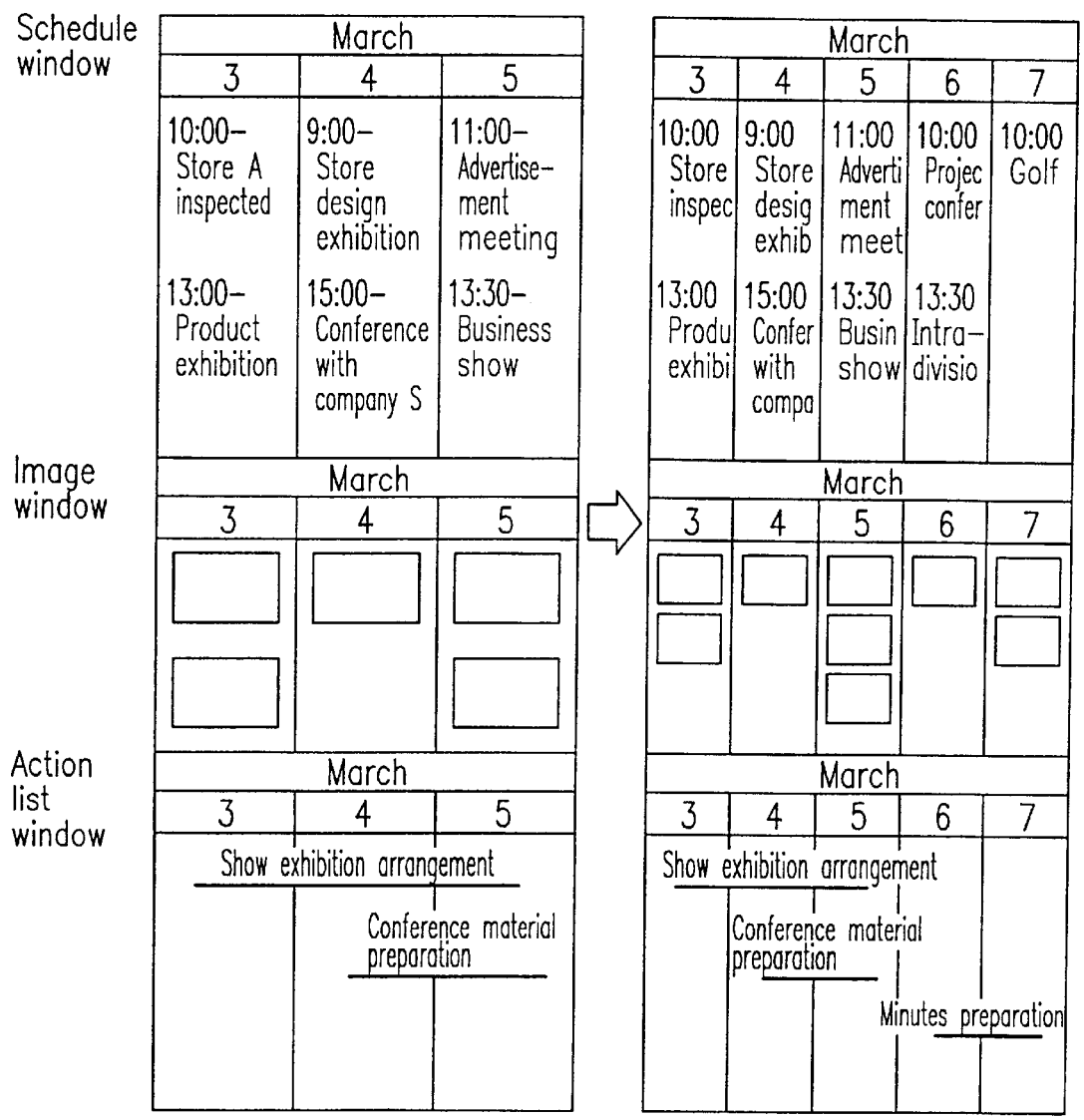
FIG. 16 shows an exemplary manner in which the change of the scale of the display unit is associated among three windows.

FIG. 16 shows an exemplary manner in which the change of the scale of the display unit is associated among three windows. For example, when the scale of the display unit is changed in the schedule window, the scale of the display unit in the image window and action list window is also changed in association with the change in the schedule window. The same is applicable when the scale of a window other than the schedule window is changed. In this manner, the scale of the display unit of the three windows is changed in association with one another. Such an association is achieved by sending a scale change message as described above. Needless to say, the scale of the display unit of four or more windows can be changed in association with one another.

2.3 Processing Performed by the Schedule List Display Section 23

The structure and processing of each of sections of the schedule list display section 23 (FIG. 2) are similar to those of the image list display section 22, and thus detailed descriptions thereof will be omitted.

3. Recording Medium

The data display application (view.exe) and the image data management file (view.dat) stored in the external memory device 14 shown in FIG. 1 can be recorded in a machine-readable recording medium. The data display application is a program allowing a computer to function as an information apparatus including the main section 21, the image list display section 22 and the schedule list display section 23. The image data management file is a data structure for allowing a computer to function as an information apparatus including the main section 21, the image list display section 22 and the schedule list display section 23. Any recording medium is usable for storing such a program and data structure. The recording medium is, for example, a floppy disk or MO. The data display application (view.exe) and the image data management file (view.dat) stored in a recording medium are input to the external memory device 14 shown FIG. 1 through a known driver device.

According to the present invention, an information apparatus for changing the display of two-dimensional data such image data in accordance with a change in the scale of a display unit is provided. Furthermore, a recording medium storing a program and a data structure for allowing a computer to function as such an information apparatus is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information apparatus, comprising:
    a management section for managing a software object in relation to a display unit;
    a scale change section for changing a scale of the display unit; and
    a display section for changing a scale of image data representing the software object in response to the change in the scale of the display unit;
    wherein the management section manages time information related to display of the software object, and the display section determines whether the software object is to be displayed or not in accordance with the time information; and
    wherein, when the time information related to display of the software object is abnormal, the display section determines whether the software object is to be displayed or not in accordance with other time information related to display of the software object.

2. An information apparatus according to claim 1, wherein the management section initializes the time information to time information related to creation of the software object when the software object is initially created.

3. An information apparatus, comprising:
    a management section for managing a first type of software object in relation to a first display unit and managing a second type of software object, which is different from the first type of software object, in relation to a second display unit;
    a first display section for displaying the first type of software object; and
    a second display section for displaying the second type of software object,
    wherein the first display section includes:
        a first scale change section for successively changing a scale of the first display unit, and
        a first display portion for changing a scale of image data representing the first type of software object in response to a successive change in the scale of the first display unit, and
    wherein the second display section includes:
        a second scale change section for successively changing a scale of the second display unit, and
        a second display portion for changing a scale of image data representing the second type of software object in response to a successive change in the scale of the second display unit,
        wherein the display areas defined by the image data representing the first and second type of software objects are different to the display areas defined by the first and second display units, respectively.

4. An information apparatus according to claim 3, wherein the first display section further includes a notification section for notifying the change in the scale of the first display unit to the second display section, and the second display section further includes a notification section for notifying the change in the scale of the second display unit to the first display section.

5. A machine-readable recording medium storing a program and a data structure for allowing a computer to function as an information apparatus comprising:
    a management section for managing a first type of software object in relation to a first display unit and managing a second type of software object, which is different from the first type of software object, in relation to a second display unit;

a first display section for displaying the first type of software object; and a second display section for displaying the second type of software object, wherein the first display section includes:
- a first scale change section for successively changing a scale of the first display unit, and
- a first display portion for changing display of image data representing the first type of software object in response to a successive change in the scale of the first display unit, and wherein the second display section includes:
- a second scale change section for successively changing a scale of the second display unit, and
- a second display portion for changing display of image data representing the second type of software object in response to a successive change in the scale of the second display unit, wherein the display areas defined by the image data representing the first and second type of software objects are different to the display areas defined by the first and second display units, respectively.

* * * * *